United States Patent
Walker et al.

(10) Patent No.: US 12,056,504 B2
(45) Date of Patent: Aug. 6, 2024

(54) AUTOMATIC APPLICATION CONFIGURATION SYNCHRONIZATION BASED ON DATA ANALYTICS

(71) Applicant: Kyndryl, Inc., New York, NY (US)

(72) Inventors: Keith Raymond Walker, Austin, TX (US); Martin G Keen, Cary, NC (US); John M Ganci, Jr., Raleigh, NC (US); Sarbajit K Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 141 days.

(21) Appl. No.: 17/831,522

(22) Filed: Jun. 3, 2022

(65) Prior Publication Data
US 2023/0393860 A1 Dec. 7, 2023

(51) Int. Cl.
*G06F 9/44* (2018.01)
*G06F 9/445* (2018.01)
*G06F 11/34* (2006.01)

(52) U.S. Cl.
CPC ...... *G06F 9/44505* (2013.01); *G06F 11/3495* (2013.01)

(58) Field of Classification Search
CPC ..................................... G06F 1/32; G06F 9/44
See application file for complete search history.

(56) References Cited

U.S. PATENT DOCUMENTS

| | | | |
|---|---|---|---|
| 8,341,249 B2 | 12/2012 | Rakowski et al. | |
| 9,563,413 B2 | 2/2017 | Chan et al. | |
| 10,025,836 B2 | 7/2018 | Batchu et al. | |
| 2014/0287818 A1* | 9/2014 | Chan | A63F 13/77 463/24 |
| 2014/0297716 A1* | 10/2014 | Grossman | H04L 67/10 709/203 |
| 2015/0188983 A1* | 7/2015 | Elias | H04L 67/04 715/744 |
| 2017/0054767 A1* | 2/2017 | Goldsmith | G06F 9/4856 |
| 2019/0138628 A1* | 5/2019 | Walker | G06F 40/295 |
| 2019/0332503 A1* | 10/2019 | Yang | G06F 11/2082 |

OTHER PUBLICATIONS

Mell et al., "The NIST Definition of Cloud Computing", NIST, Special Publication 800-145, Sep. 2011, 7 pages.

(Continued)

*Primary Examiner* — Keshab R Pandey
(74) *Attorney, Agent, or Firm* — Erik Swanson; Rupam Bhar; Calderon Safran & Wright P.C.

(57) ABSTRACT

A computer-implemented method, including monitoring, by a computing device, usage data of an application on a primary user device; detecting, by the computing device, a mirroring of the application on a secondary user device based on an identification of the application; determining, by the computing device, a synchronization setting of the application including a secondary user device based on a historical synchronization data for the application; and generating, by the computing device, a synchronization configuration for the application on the secondary user device based on the usage data; and synchronizing, by the computing device, the application on the secondary user device with the synchronization configuration.

20 Claims, 6 Drawing Sheets

(56) References Cited

OTHER PUBLICATIONS

Unknown, "Next Best Action identification based on simulation of possible actions outcomes evaluated from perspective of scoring and time series prediction", IP.com No. IPCOM000261625D, published Mar. 23, 2020, 6 pages.

Unknown, "Systems and Methods for Automated System Generation", IP.com No. IPCOM000262168D, published May 7, 2020, 6 pages.

Unknown, "System and Method for Dynamic No-Code Curation of Custom Data Models from Standard Data Models", IP.com No. IPCOM000264991D, published Feb. 15, 2021, 11 pages.

Beckhoff Automation Gmbh & Co. KG, "Creating value: IoT and Data Analytics from Beckhoff", www.beckhoff.com/IoT. downloaded May 26, 2022, 30 pages.

* cited by examiner

AUTOMATIC APPLICATION CONFIGURATION SYNCHRONIZATION BASED ON DATA ANALYTICS

BACKGROUND

Aspects of the present invention relate generally to application configuration synchronization and, more particularly, to synchronizing use of applications while minimizing resource costs.

Many users have multiple computing devices. These users may use software applications on each of these devices to view or work on projects within those software applications. Some of these software applications may not have the capability to synchronize over multiple devices. Mirroring of an application on a plurality of devices involves execution of the same application on different devices. Synchronization of the application involves synchronization of usage of the application (including files being used and location of playback in those files) on one device with another device executing the same mirrored application. Users may want to synchronize selected applications without having to copy or redo operations among the devices, and further may want this syncing to occur automatically. For example, a person may open a web browser on one device and may want to continue using/reading the same websites on a different device. The web browser would have to have the capability to synchronize to another device, and in some cases, may not be able to synchronize without the user re-navigating to the previously open websites. In another example, a user may be watching a multimedia stream on a device and wish to resume where they left off at another device. A synchronization would then include a multimedia file played over the multimedia stream, and a timestamp and/or a pointer to a bookmarked location of the media stream.

SUMMARY

In a first aspect of the invention, there is a computer-implemented method including: monitoring, by a computing device, usage data of an application on a primary user device; determining, by the computing device, a synchronization setting of the application including a secondary user device based on a historical synchronization data for the application; generating, by the computing device, a synchronization configuration for the application on the secondary user device based on the usage data; and synchronizing, by the computing device, the application on the secondary user device with the synchronization configuration.

In another aspect of the invention, there is a computer program product including one or more computer readable storage media having program instructions collectively stored on the one or more computer readable storage media. The program instructions are executable to: monitor usage data of an application on a primary user device; determine a synchronization setting of the application including a secondary user device based on a historical synchronization data for the application; generate a synchronization configuration for the application on the secondary user device based on the usage data; and synchronize the application on the secondary user device with the synchronization configuration.

In another aspect of the invention, there is system including a processor, a computer readable memory, one or more computer readable storage media, and program instructions collectively stored on the one or more computer readable storage media. The program instructions are executable to: monitor usage data of an application on a primary user device; detect a mirroring of the application on a secondary user device based on an identification of the application and a change to a configuration of the application on the secondary user device; store the change to the configuration and an identifier of the application in a knowledge base; determine a synchronization setting of the application including a secondary user device based on a historical synchronization data for the application from the knowledge base; generate a synchronization configuration for the application on the secondary user device based on the usage data; and synchronize the application on the secondary user device with the synchronization configuration.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to application configuration synchronization, and more particularly, to synchronizing configuration of applications over multiple devices. In embodiments, a computing device facilitates synchronization of the application for a user based on the user device, personal preferences, and synchronization history. In this manner, implementations of the invention provide an efficient and effective use of computer resources when synchronizing applications for use by users and reduce the costs of development and maintenance by application developers.

In aspects of the invention, there is a system and method to enable automatic creation of application configuration synchronization. The automatic creation of application configuration synchronization may include collecting device usage data from a monitoring device, wherein the usage data includes changes made to a second monitored device (e.g., secondary user device) that are detected to mirror a first monitored device (e.g., primary user device) in configuration; responsive to the detected mirroring, storing at least one configuration change in a data repository along with an application identifier that is queried by a data analytics device; calculating from the data analytics device the similarity of changes for the identified application that have been used on prior monitored uses of the system; and creating a synchronization configuration based on the calculated similarity to a synchronization device (e.g., a historic synchronized user device), such that changes made to a third monitored device (e.g., third user device) detected by the monitoring device may be synchronized to a fourth monitored device (e.g., fourth user device) by the synchronization device.

The automatic application configuration synchronization may include the device usage data that indicates at least one of a file transfer and an application setting change. The automatic application configuration synchronization may further include applying a machine learning model trained on observed user behavior to recognize relevant application data and to synchronize the relevant data. In embodiments, the data analytics device may include computer modeling such as machine learning and/or natural language processing (NLP) models to recognize relevant application data and synchronize the relevant data. The terms "machine learning", "machine learning model" and "machine learning processing" may denote methods of enabling a computer system to improve its capabilities automatically through experience and/or repetition without procedural programming. For example, machine learning algorithms build a mathematical model based on sample data, known as "training data", to make predictions or decisions without being explicitly programmed to do so.

Software developers and service providers may individually decide whether such a synchronization feature is useful for its users. Each application thus requires development and maintenance of those synchronization features for the application which incurs development costs. Further, synchronization feature issues may stem from user error (e.g., a user not allowing synchronize or not updating the application to synchronize correctly), utilization of synchronization mechanisms that are unwanted (e.g., a synchronization utilizing non-trusted services), a synchronization that may not meet user requirements (e.g., a synchronization that does not include configurations or content that the user requires), or synchronization malfunction (e.g., device or application changes that effect the synchronization feature such as compatibility). In the example of a multimedia stream, the developer of the application would have to develop and maintain a synchronization feature for the multimedia stream application and potentially any issues such as compatibility that may occur. Thus, each developer wanting to include the synchronization feature would incur this additional continued cost for each application.

Accordingly, implementations of the invention provide an improvement in the technical field of application configuration synchronization by providing a technical solution to the above known problems of synchronizing to different user devices for convenience. For example, in embodiments, the technical solution may include, amongst other features: monitoring usage data of an application on a primary user device; determining a synchronization setting of the application including a secondary user device based on a historical synchronization data for the application; generating a synchronization configuration for the application on the secondary user device based on the usage data; and synchronizing the application on the secondary user device with the synchronization configuration. The technical solution may also determine synchronization settings based on synchronization events. These steps allow the application configuration synchronization to better predict user needs for application synchronization by utilizing historical knowledge of synchronization of applications on particular devices. Further, these steps allow the application configuration synchronization to more efficiently provide users with a system to automatically and effectively synchronize application usage to a secondary user device by managing and tracking synchronization configurations and usage data for the application. The technical solution also allows users and application providers to synchronize the application using different services that may have higher security or government vetting. Further, synchronization configurations may be managed by removing older, potentially malfunctioning configurations and add and rate newer configurations that have been more recently verified higher.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
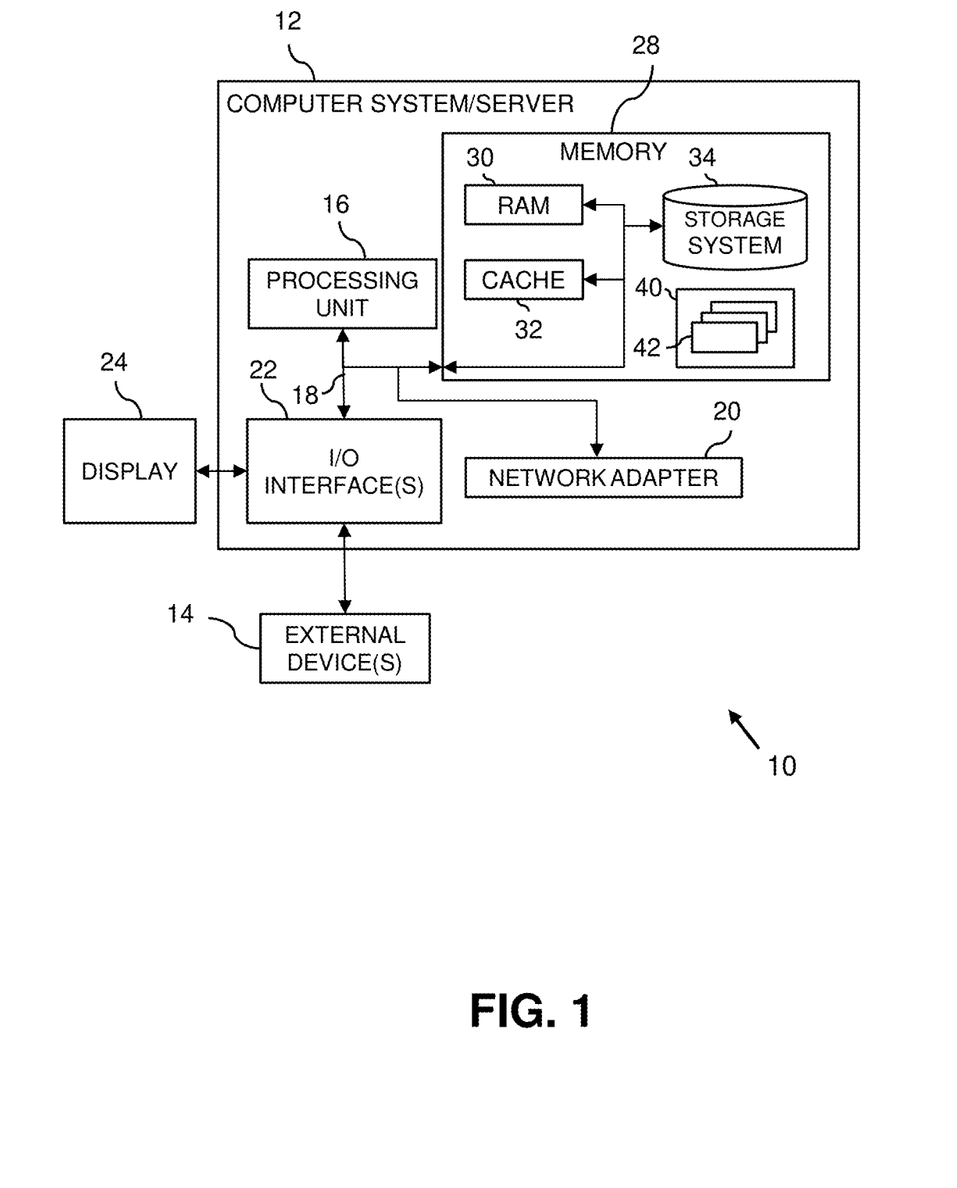
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
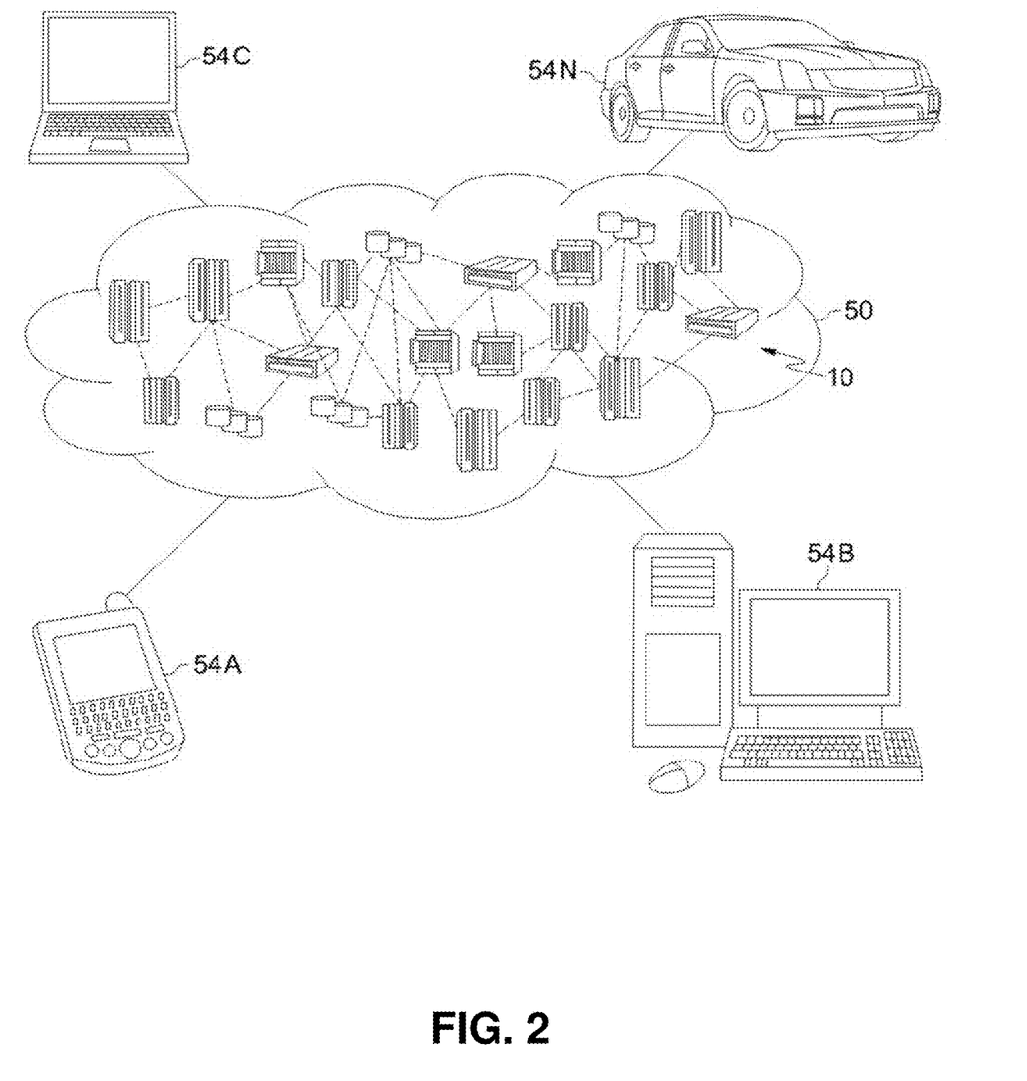
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
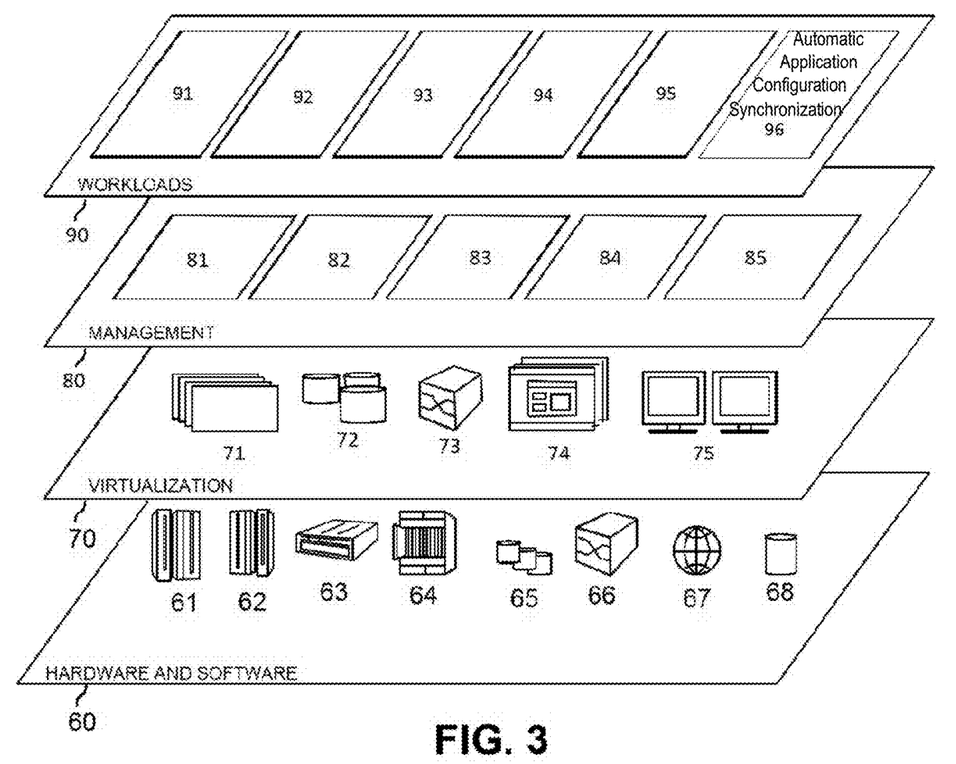
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing and automatic application configuration synchronization 96.

Implementations of the invention may include a computer system/server 12 of FIG. 1 in which one or more of the program modules 42 are configured to perform (or cause the computer system/server 12 to perform) one of more functions of the automatic application configuration synchronization 96 of FIG. 3. For example, the one or more of the program modules 42 may be configured to: monitor usage data of an application on a primary user device; determine a synchronization setting of the application including a secondary user device based on a historical synchronization data for the application; generate a synchronization configuration for the application on the secondary user device based on the usage data; and synchronize the application on the secondary user device with the synchronization configuration.

Figure 4:
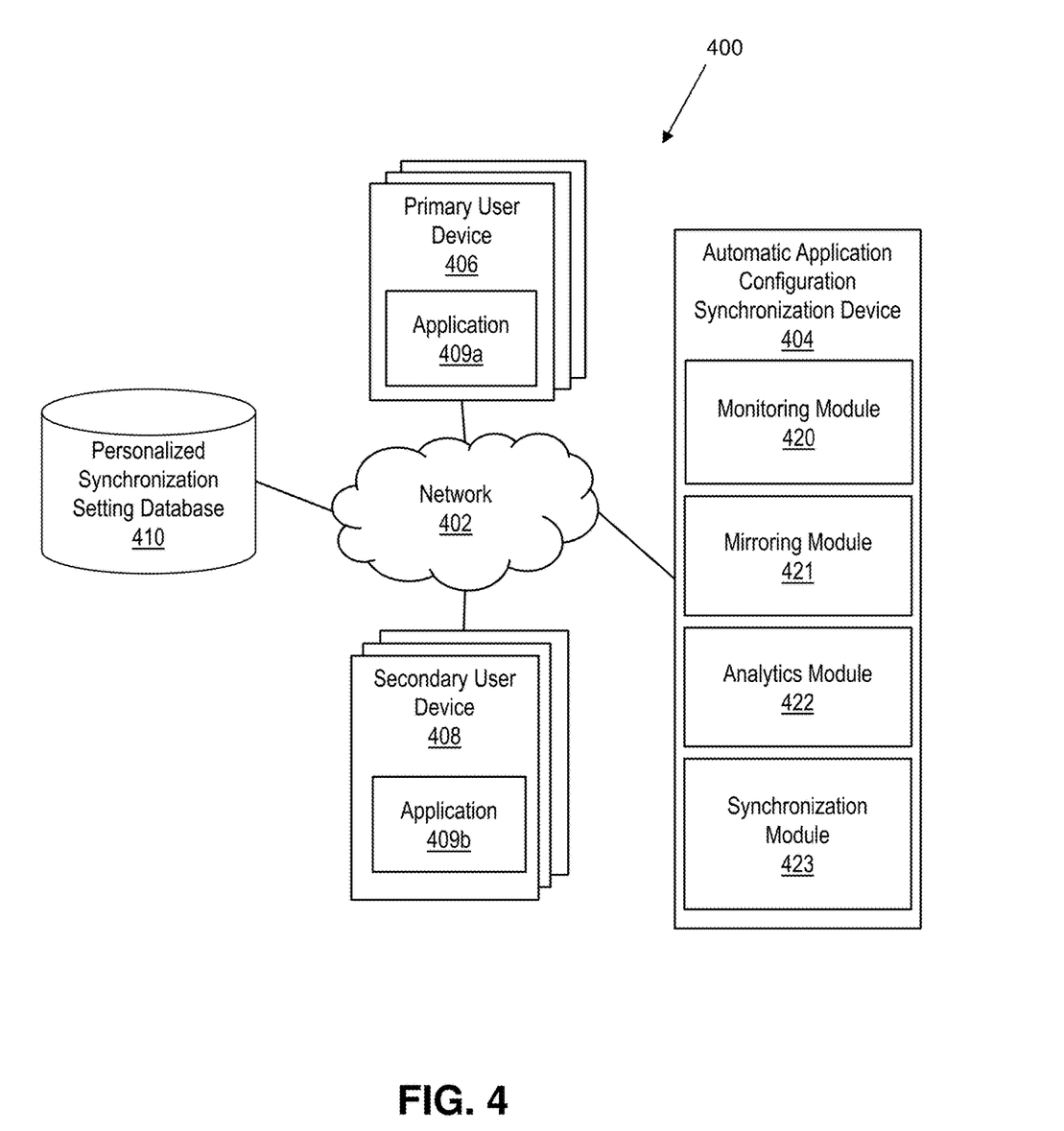
FIG. 4 shows a block diagram of an exemplary environment in accordance with aspects of the invention.

FIG. 4 shows a block diagram of an exemplary environment in accordance with aspects of the invention. In embodiments, the automatic application configuration synchronization environment 400 includes a network 402 enabling communication between automatic application configuration synchronization device 404, primary user device 406, secondary user device 408 (also referred to as a synchronized user device), and personalized synchronization setting database 410.

In embodiments, primary user device 406 comprises a computing device (e.g., the computer system/server 12 of FIG. 1, or elements thereof) in a networked environment. In implementations, the primary user device 406 comprises a personal computing device (e.g., 54A, 54B, 54C, etc.) in the cloud computing environment 50 of FIG. 2. The primary user device 406 may comprise one or more program modules such as program modules 42 described with respect to FIG. 1. In accordance with aspects of the invention described below, the primary user device 406 may manage and store application configurations and access or store personal settings associated with synchronization of applications and usage data of the applications. Primary user device 406 is configured to run application(s) 409a. The primary user device 406 may send or allow access to the automatic application configuration synchronization device 404 to monitor or collect usage data for the application(s) 409a.

In embodiments, secondary user device 408 comprises a computing device (e.g., the computer system/server 12 of FIG. 1, or elements thereof) in a networked environment. In implementations, the secondary user device 408 comprises a personal computing device (e.g., 54A, 54B, 54C, etc.) in the cloud computing environment 50 of FIG. 2. The secondary user device 408 may comprise one or more program modules such as program modules 42 described with respect to FIG. 1. In accordance with aspects of the invention described below, the secondary user device 408 accepts synchronization configurations for application(s) 409b that correspond with the application(s) 409a of the primary user device 406.

In implementations, a personalized synchronization setting database 410 manages and stores information about a user's devices 406 and 408, application(s) 409a and 409b, and preferences for synchronization (e.g., file transfer service selection, network type and selection used for syncing, and selection of configurations of the application(s) 409a and 409b). In implementations, the user may select to opt in or opt out for particular user devices. For example, a user may have many devices including a smart watch, digital tablet, smartphone, and laptop. The user may opt in the laptop and smartphone, and opt out the smart watch and digital tablet. In such an instance, synchronization may only occur between the laptop and smartphone.

In implementations, the automatic application configuration synchronization device 404 comprises one or more server computing devices each including one or more elements of the computer system/server 12 of FIG. 1. In one example, the automatic application configuration synchronization device 404 comprises one or more virtual machines (VMs) or one or more containers running on one or more server computing devices. In embodiments, the automatic application configuration synchronization device 404 is configured to automatically synchronize application(s) 409a on primary user device 406 to secondary user device 408 as application(s) 409b. In embodiments, and as described herein, the automatic application configuration synchronization device 404 determines synchronization settings of the application(s) 409a based on historical synchronization data. The synchronization settings are used as settings for the secondary user device 408 to synchronize at least one of a service provider (e.g., for cloud environments), a file transfer, a network upon which the primary and secondary user devices sync, a schedule for the synchronization, and caching.

In embodiments, the automatic application configuration synchronization device 404 comprises monitoring module 420, mirroring module 421, analytics module 422, and synchronization module 423, each of which may comprise one or more program modules such as program modules 42 described with respect to FIG. 1. The automatic application configuration synchronization device 404 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the monitoring module 420 is configured to collect usage data including configuration or usage changes of the application 409a on the primary user device 406. In embodiments, the monitoring module 420 works with the primary user device 406 to access these application usages. In embodiments, the monitoring module 420 also includes a hardware or software component residing on the primary user device 406. In embodiments, the monitoring module 420 detects usage data of the application and the user device that includes information from applications and operating systems (OS) of the devices on which the applications are executed. For example, an application may allow the usage data collection through an application programming interface (API), a log or a configuration file (e.g., with a specific location and/or parse-able syntax), and/or collection through a specific network packet behavior. In exemplary embodiments, usage data may be collected through OS facilitated monitoring via the APIs to obtain data about and in files, registries, file transfers, network usage, elements of an application such as window titles, object references, and graphical elements that may be analyzed with an optical character recognition (OCR) or pattern recognition system.

In embodiments, the monitoring module 420 operates autonomously. In other embodiments, the monitoring module 420 is executed through a user command. In embodiments, the usage data may be configured by user selected policies that may limit monitoring to exclude certain devices, applications, files or parts of files. For example, as addressed above, a user may opt out and prevent transmission of usage data for particular user devices, applications, files, or parts of files. Additionally, personal identifiers or sensitive information may be obfuscated. In an exemplary embodiment, a user may request synchronization settings from a knowledge base. For example, when a user opts out, they may be provided with synchronization settings that match applications the user would still like to sync, without providing any monitored data to the monitoring module 420. In embodiments, the usage data indicates a file transfer or a change to a setting of the application. For example, user use of an application for syncing often coincides with files or projects that they are working on both from home and at work.

In embodiments, the synchronization settings may include data defining a synchronization event (e.g., user events that resulted in a syncing), potential secondary user device, application(s), location of the user device, scheduling of the synchronization, one or more service providers for services that may be needed for syncing (e.g., a cloud service provider, an OCR service, etc.), a file transfer (e.g., streaming media or file(s) that are being used), a network (e.g., particular selected networks and/or networks with particular capabilities such as hard-wired ethernet or wireless ethernet type a/b/g), and/or a caching (e.g., whether and/or how much caching is needed for efficient synchronization based on the computing resources of the user device) for a particular user.

In embodiments, the mirroring module 421 is configured to determine whether a user device (e.g., primary user device 406 or secondary user device 408) is executing a mirroring of an application on a secondary user device 408. The primary user device 406 may request application 409b be run on the secondary user device 408. In exemplary embodiments, the secondary user device 408 may run the same application 409b as the application 409a that is already running on the primary user device 406. The mirroring module 421 may determine or identify this mirroring by identifying that the same application was executed without monitoring usage data of the application 409a. Instead, the mirroring module 421 may determine mirroring to manage, train, and/or store synchronization settings for different applications and devices. In one example, the mirroring module 421 stores any synchronization configuration changes for the application 409b (on secondary user device 408) from application 409a (on primary user device 406). This storing of new synchronization configurations expands the knowledge base for running the mirrored application of particular applications 409a and 409b on particular user devices (e.g., primary user device 406 and secondary user device 408).

In embodiments, the synchronization configurations are associated with the actual application configuration and/or settings. The synchronization configurations may include application settings for each user device (406 or 408) to execute on the user device. The synchronization configurations may include, for example, file transfer settings, display settings, input settings, etc. that are used during use of the application on the user device. In exemplary embodiments, the synchronization configurations may be collected from a configuration database or log file. In exemplary embodiments, the synchronization configurations are stored in a knowledge base under an identifier of the application for a user.

In embodiments, the synchronization configurations may be determined using a machine learning model trained with information about user devices and applications as well as their settings. In exemplary embodiments, the machine learning model may include a convolutional neural network (CNN) or k-nearest neighbors (kNN) algorithm. Each machine learning model may be trained using training data comprising historical usage data of the application and device to determine which configurations an application 409b should use on the secondary user device 408 to mirror and synchronize with the usage of the application 409a on the primary user device 406. The machine learning model may then be used with real-time data to predict the synchronization configuration of an application. In an instance where a particular streaming media application may never have existed in the knowledge base, the machine learning model may utilize information from the knowledge base related to another streaming media application that has previously been run on the same user device. Some settings for the streaming media application may be taken from similar streaming media applications and others may be from other applications on the user device. The machine learning model may then be used to predict these synchronization configurations based on historical knowledge in the knowledge base. In embodiments, the synchronization configurations may be based on the usage data of the application, for example when a user utilizes the application and makes settings changes or opens websites or files in the application which require particular configurations of the application. Thus, based on this usage data, the application may be configured with its most recent synchronization configuration.

In embodiments, the analytics module 422 is configured to determine synchronization settings of an application. In embodiments, the analytics module 422 uses historical knowledge about synchronization data to establish new synchronizations of applications on different user devices. In embodiments, personalized synchronization setting database 410 may be accessed to provide the historical knowledge about synchronization data for a user. In exemplary embodiments, the personalized synchronization setting database 410 may further include user policies that define when and where to synchronize applications. For example, one such policy may define that when the primary user device and secondary user device are close together in a location and the secondary user device has more computer resources (whether the resources be display area, processing power/speed, etc.), the application should be synchronized to the secondary user device. In exemplary embodiments, users may have a plurality of devices that they use (e.g., laptop, desktop, watch, mobile device, etc.). Each device may be selected to opt in as part of a group of secondary user devices that can be selected in mirroring and synchronization. This other group of secondary user devices may be selected from for mirroring and synchronization of the application based on historical knowledge of which secondary user device is often selected for use by the user for particular usages (as drawn from the usage data). For example, a user may commonly use a laptop (i.e., the primary user device) to read emails and when in movement, may switch to a mobile device (i.e., a secondary user device). The user may commonly select their smart phone as the secondary user device when no other larger screen device is available. However, when a smart tablet is available, the user will select the tablet over the phone because of the larger screen space and ease of typing. Thus, the analytics module 422 would, in the instance where the user has a smart tablet on them (based on the location of the tablet), determine that a synchronization should occur to the smart tablet from the laptop.

In embodiments, the analytics module 422 may utilize machine learning models to predict when and where synchronization of an application should occur. This machine learning model of the synchronization settings is trained with synchronization data (e.g., synchronization events) for when and where synchronizations of application are enacted for/by a user. Similar to the machine learning model of the synchronization configuration above, the machine learning model may include a convolutional neural network (CNN) or k-nearest neighbors (kNN) algorithm. Each machine learning model is trained with synchronization data for when, where, and potentially why synchronizations occur. In exemplary embodiments, the machine learning model may collect synchronization data that indicates synchronization events. This synchronization data may include locations of the devices (e.g., device and synchronized device), information about the device, information about the synchronized device, user calendar information, user selections/actions on the device prior to synchronization, user approval and/or selection of synchronization, device and application usage, etc. and whether a synchronization occurred or not. Each of these factors may be introduced to train the machine learning model to determine a group of factors that may nearest determine whether a synchronization of an application 409a and 409b should occur. For example, time of a synchronization may show synchronization should likely occur based on indication that the user leaves work regularly. In embodiments, the analytics module 422 is operated by a service provider (e.g., cloud computing service) to accommodate the computation, storage, and network needs for synchronization.

In exemplary embodiments, the synchronization settings may include a weighting of synchronization events that predict that a user would like to synchronize an application to a different device. For example, calendar events that indicate that the user is leaving a work location for home are weighted more heavily than the user closing out of the application without finishing their reading of a website. In an exemplary embodiment, a synchronization event may include a rating or detection of success for synchronization. For example, when a user consistently shuts down a work computer at work near or around close of business during the work week and synchronizes the previously worked in application at a home computer at night, it is expected (i.e., has a higher rating) that such a synchronization event will result in the synchronization of the user's work at the home computer. A rating is also made for consistently correct synchronizing. For example, an application may not synchronize correctly on the user's home computer even though the user consistently requests the application to be synced. Thus, the synchronization event for that application would be lower rated.

In embodiments, other synchronization events include a more complete scope (i.e., completeness) of configuration of the application, more efficient use of computing resources (e.g., running applications that require more processing power on user devices that have the capability to provide more processing power than the secondary user device), historical error in synchronizing, and/or user expertise in synchronization (e.g., users that often synchronize applications on the same user devices such as long term users of application configuration synchronization). In exemplary embodiments, more recent data on synchronizations will be weighted higher, however recent data has less consistent results and may be detected as a synchronization event in error. In particular when synchronization results in errors, more recent data on synchronization events are important to prevent synchronization breaks as newer synchronization events may be using newer synchronization configurations that work contemporaneously. For example, synchronization may malfunction and not work when the application has not been updated, or OS version upon which the application is running is outdated.

In embodiments, the analytics module 422 calculates a synchronization similarity of the synchronization setting to the historical synchronization data to help determine how accurate a prediction may be. For example, a same synchronization setting would calculate a high synchronization similarity which indicates that the same synchronization should be predicted to occur. If many factors of the synchronization setting are different, then the likelihood that a synchronization should occur is low.

In embodiments, the synchronization module 423 is configured to utilize user or service provider preferred infrastructure to synchronize application 409b with application 409a using the synchronization configurations. In exemplary embodiments, the synchronization configuration is generated by the synchronization module 423 using the usage data, information about the secondary user device 408, and the user or service provider preferences for applications. The synchronization module 423 may collect this information to determine configurations of the application 409b on the secondary user device 408. For example, usage data and user or service provider preferences may show a particular file is used and which file transfer service should be used to receive the file at the secondary user device 408. In other words, in some instances, the synchronization module 423 may instruct the secondary user device 408 to use infrastructure provided by another service provider. For example, a synchronization event for an application may be predetermined by a user or service provider. Instead of using the application's preferred file transfer service, the synchronization module 423 may request, based on user or service provider selection, a file transfer be handled by the OS manufacturer's file transfer service or an alternate file transfer service. These services may also require user credentials, payments, or the like based on access and thus may request information from the user or service provider to enact a synchronization. Further, the synchronization module 423 is configured to allow a user or service provider to select various services to establish the synchronization, including a file transfer service, network selection, and/or synchronizations configuration selection.

In embodiments, caching may occur for files or parts of files based on network requirements, computing power of the secondary user device, and/or users or user groups that have the same synchronization events. In exemplary embodiments, users or user groups that often synchronize the same applications or files used by the same applications. For example, if a group of users tend to synchronize the same multimedia and/or metadata obtained from the same multimedia tagging service (e.g., album cover art, movie posters, TV show theme music, movie trailers, actor biographies, descriptions, etc.), a synchronization event for one user may have the file transfer for the multimedia cached for later direct download by other users of the same group. Thus, the caching avoids redundant file uploads to the service provider. Further, redundancy may be included to improve service reliability. Similarly, edge computing may be used to reduce bandwidth, improve response time, and improve synchronization speed.

In exemplary embodiments, the synchronization configuration is based on a calculated first and secondary user device similarity to other devices. For example, the predicted/selected secondary user device may determine the settings for the application that can/cannot be applied. Thus, a third user device and fourth user device similar to the primary and secondary user devices can be synchronized with similar synchronization configurations. When the first and secondary user device have little to no differences to a third and fourth user device, the synchronization configuration including a changed configuration between the first and second user devices will be similarly applied when mirroring the same application on the third and fourth user devices.

Figure 5:
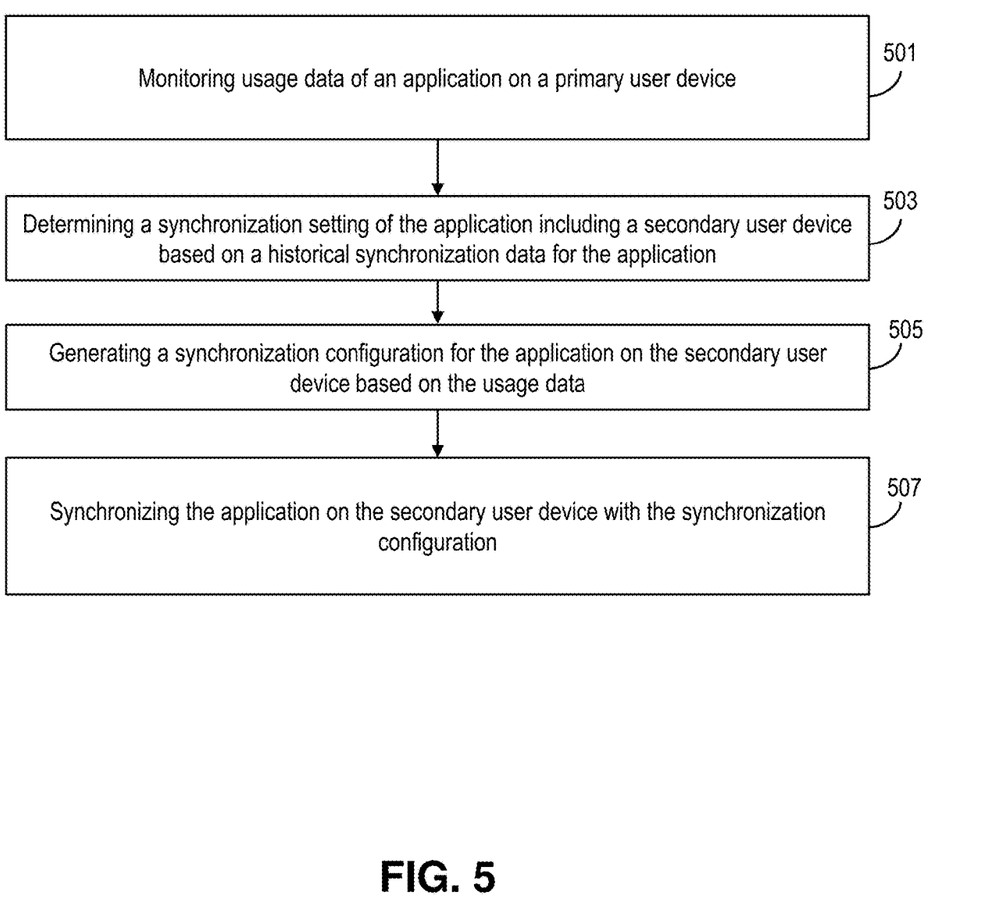
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the automatic application configuration synchronization device 404 of FIG. 4 monitors usage data of an application on a primary user device.

At step 503, the automatic application configuration synchronization device 404 of FIG. 4 determines a synchronization setting of the application including a secondary user device based on a historical synchronization data for the application.

At step 505, the automatic application configuration synchronization device 404 of FIG. 4 generates a synchronization configuration for the application on the secondary user device based on the usage data.

At step 507, the automatic application configuration synchronization device 404 of FIG. 4 synchronizes the application on the secondary user device with the synchronization configuration.

One example of this exemplary method includes a user working with a financial spreadsheet and completing a survey during work on a work laptop. The user disconnects from the laptop and moves to a mobile device during their commute home. The automatic application configuration synchronization device 404 monitors the open applications, open tabs in the applications (e.g., web browser), and entered form fields. The automatic application configuration synchronization device 404 determines the user disconnecting from the laptop and turning on the mobile device is a synchronization event that show a synchronization should occur. The automatic application configuration synchronization device 404 also determines that the user never does financial work on their mobile device from the synchronization settings, thus, the automatic application configuration synchronization device 404 synchronizes the web browser, open tab, and entered form fields however, no synchronization of the financial spreadsheet occurs.

Another example includes another user working to edit videos in a video editing program on their home desktop. The user has a calendar event showing they will be going on a short trip out of town. The automatic application configuration synchronization device 404 may identify this usage data to match the usage to a synchronization event and determine that the user will likely want to continue to edit the video they are working on their laptop. The automatic application configuration synchronization device 404 determines the files needed for immediate editing (e.g., files the user has recently used in the video or added to the editor) and may cache the video files or transfer a portion of the video files that the user will likely be working with. For example, this determination that the files that are needed may be from the usage data of the application by identifying that the user is in the middle of a video edit, the user just or previously added particular video files which have been untouched, or recently used only a part of a video file. These video files will then be collected by the secondary user device 408. In exemplary embodiments, the automatic application configuration synchronization device 404 determines whether the laptop has enough free memory and processing power to complete the video editing and in some instances, may even close applications or files that may free up space on the laptop to synchronize the video edit. For example, the automatic application configuration synchronization device 404 may compare information known about the secondary user device 408 and/or a monitored usage of the secondary user device 408.

Figure 6:
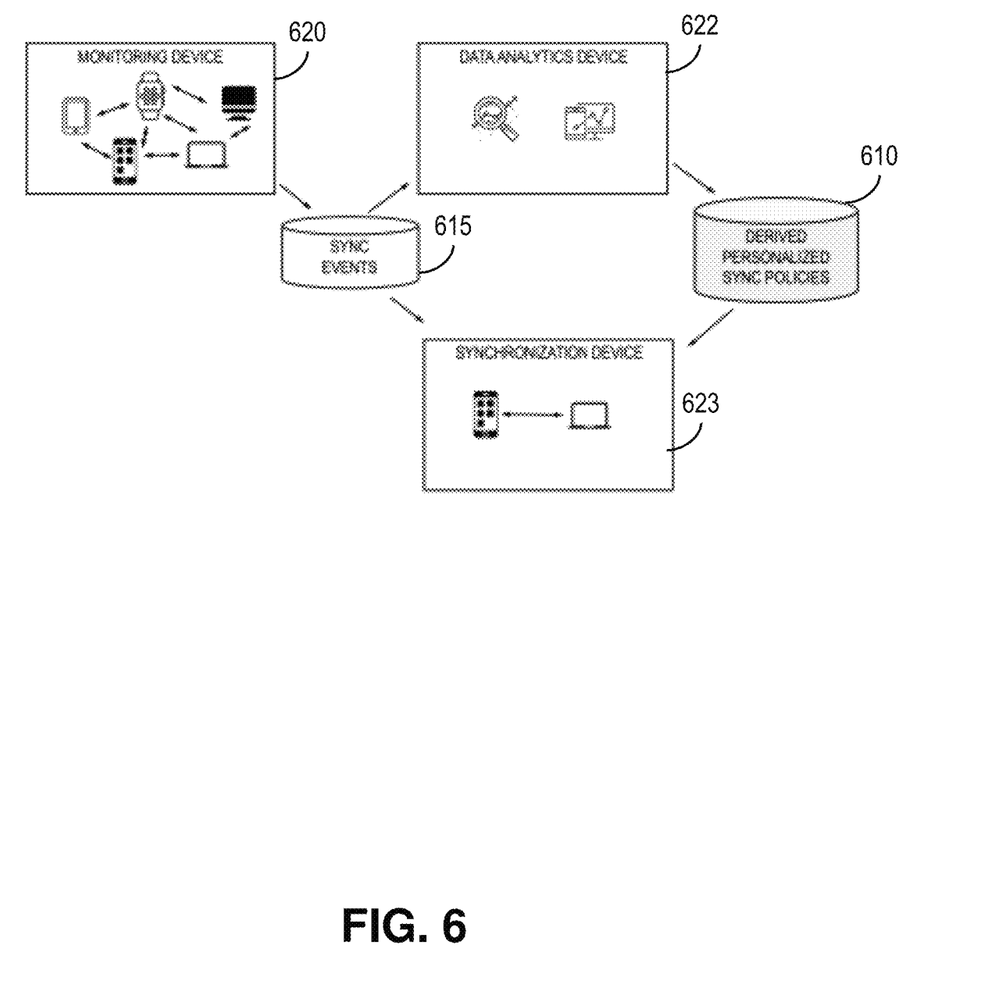
FIG. 6 shows a diagram of exemplary components of the automatic application configuration synchronization device in accordance with aspects of the present invention.

FIG. 6 shows a diagram of exemplary components of the automatic application configuration synchronization device 404 in accordance with aspects of the present invention. In the exemplary embodiments the components may include or represent modules of the automatic application configuration synchronization device 404 of FIG. 4 as separate devices. Each device (620, 622, and 623) may have varied access to a synchronization events database 615 and a personalized synchronization policies database 610 (similar to the personalized synchronization setting database 410 of FIG. 4). In embodiments, the monitoring device 620 (similar to the monitoring module 420 of FIG. 4) provides usage data that may be stored in the synchronization events database 615. In embodiments, the monitoring device 620 monitors/collects usage data about user devices 406 and 408 that may be opted in to the monitoring by the user. In one example, the devices shown within box of the monitoring device 620 are the opted in user devices 406 and 408 and represent nodes in a mesh network. Each of the devices in the box of monitoring device 620 may be used for any of the devices shown in FIG. 6 (monitoring device 620, analytics device 622, or synchronization device 623). For example, a laptop that is part of the mesh network of device in the box of monitoring device 620 may be configured to act as any or all of the devices 620-623.

In embodiments, the synchronization events from the synchronization events database 615 may be used in the analytics device 622 (similar to the analytics module 422 of FIG. 4) and the synchronization device 623 (similar to the synchronization module 423 of FIG. 4) to determine synchronization settings (from the analytics device 622) and synchronization configurations (from the synchronization device 623). The analytics device 622 may provide synchronization settings to the personalized synchronization policies database 610 which may determine when synchronizations should occur. The synchronizations executed by the synchronization device 623.

In embodiments, a service provider could offer to perform the processes described herein. In this case, the service provider can create, maintain, deploy, support, etc., the computer infrastructure that performs the process steps of the invention for one or more customers. These customers may be, for example, a software application services business or application service provider that wants to enhance customer experience with seamless synchronization of applications run on the service. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
monitoring, by a computing device, usage data of an application on a primary user device;
determining, by the computing device, a synchronization setting of the application including selection of a secondary user device based on historical synchronization data for the application;
generating, by the computing device, a synchronization configuration for the application on the selected secondary user device based on the usage data; and
synchronizing, by the computing device, the application on the secondary user device with the synchronization configuration, wherein the synchronization configuration includes a change to a setting of the application on the selected secondary user device from the application on the primary user device.

2. The computer-implemented method of claim 1, further comprising:
    detecting a mirroring of the application on the secondary user device based on an identification of the application; and
    storing the synchronization setting of the application on the secondary user device and an identifier of the application in a knowledge base.

3. The computer-implemented method of claim 1, further comprising:
    calculating a synchronization similarity of the synchronization setting to the historical synchronization data.

4. The computer-implemented method of claim 3, wherein the synchronization configuration is based on the synchronization similarity.

5. The computer-implemented method of claim 4, wherein the synchronization configuration provides a configuration change to mirror the application on a third user device to a fourth user device.

6. The computer-implemented method of claim 1, wherein the determining of the synchronization setting of the application is further based on a personalized user synchronization setting.

7. The computer-implemented method of claim 1, wherein the determining of the synchronization setting of the application is based on a weighting of a synchronization event associated with the synchronization setting.

8. The computer-implemented method of claim 1, wherein the usage data indicates at least one of a file transfer and a change to a setting of the application.

9. The computer-implemented method of claim 1, wherein the determining of the synchronization setting of the application utilizes a machine learning model trained with the historical synchronization data.

10. The computer-implemented method of claim 1, wherein the synchronization setting includes data defining one or more selected from the group consisting of:
    a synchronization event;
    a service provider;
    a file transfer;
    a network;
    a location of the primary user device and secondary user device;
    the application that is eligible for synchronization;
    a schedule of the synchronization; and
    a caching.

11. The computer-implemented method of claim 7, wherein the synchronization event is based on one or more selected from the group consisting of:
    a rating and/or determination of success of the synchronizing;
    a completeness of the configuration;
    an efficiency of using computing resources of the secondary user device;
    a historical error in the synchronizing; and
    a synchronization expertise of a user or group of users associated with the secondary user device.

12. The computer-implemented method of claim 1, wherein the computing device includes software provided as a service in a cloud environment.

13. A computer program product comprising one or more computer readable storage media having program instructions collectively stored on the one or more computer readable storage media, the program instructions executable to:
    monitor usage data of an application and a primary user device;
    determine a synchronization setting of the application including a selection of a secondary user device based on historical synchronization data for the application;
    generate a synchronization configuration for the application on the selected secondary user device based on the usage data; and
    synchronize the application on the secondary user device with the synchronization configuration, wherein the synchronization configuration includes a change to a setting of the application on the selected secondary user device from the application on the primary user device.

14. The computer program product of claim 13, wherein the determining of the synchronization setting of the application is further based on a personalized user synchronization setting.

15. The computer program product of claim 13, wherein the synchronization setting includes data defining one or more selected from the group consisting of:
    a synchronization event;
    a service provider;
    a file transfer;
    a network;
    a location of the primary user device and secondary user device;
    the application that is eligible for synchronization;
    a schedule of the synchronization; and
    a caching.

16. The computer program product of claim 13, wherein the determining of the synchronization setting of the application is based on a weighting of a synchronization event associated with the synchronization setting.

17. A system comprising:
    a processor, a computer readable memory, one or more computer readable storage media, and program instructions collectively stored on the one or more computer readable storage media, the program instructions executable to:
    monitor usage data of an application on a primary user device;
    detect a mirroring of the application on a selected secondary user device based on an identification of the application and a change to a configuration of the application on the selected secondary user device;
    store the change to the configuration and an identifier of the application in a knowledge base;
    determine a synchronization setting of the application based on historical synchronization data for the application from the knowledge base;
    generate a synchronization configuration for the application on the selected secondary user device based on the usage data; and
    synchronize the application on the selected secondary user device with the synchronization configuration, wherein the synchronization configuration includes a change to a setting of the application on the selected secondary user device from the application on the primary user device.

18. The system of claim 17, wherein the determining of the synchronization setting of the application is further based on a personalized user synchronization setting.

19. The system of claim 18, wherein the synchronization setting includes data defining one or more selected from the group consisting of:
    a synchronization event;
    a service provider;
    a file transfer;
    a network;

a location of the primary user device and secondary user device;
the application that is eligible for synchronization;
a schedule of the synchronization; and
a caching.

20. The system of claim 17, wherein the determining of the synchronization setting of the application is based on a weighting of a synchronization event associated with the synchronization setting.

* * * * *